US012802075B2

(12) United States Patent
Lowe et al.

(10) Patent No.: US 12,802,075 B2
(45) Date of Patent: Nov. 17, 2026

(54) METHOD AND SYSTEM FOR GENERATING A DYNAMIC CARD VERIFICATION VALUE FOR PROCESSING A TRANSACTION

(71) Applicant: CompoSecure, LLC, Somerset, NJ (US)

(72) Inventors: Adam Lowe, Somerset, NJ (US); Todd Nuzum, Somerset, NJ (US)

(73) Assignee: CompoSecure, LLC, Somerset, NJ (US)

(*) Notice: Subject to any disclaimer, the term of this patent is extended or adjusted under 35 U.S.C. 154(b) by 0 days.

(21) Appl. No.: 18/037,465

(22) PCT Filed: Nov. 17, 2021

(86) PCT No.: PCT/US2021/059607
§ 371 (c)(1),
(2) Date: May 17, 2023

(87) PCT Pub. No.: WO2022/108959
PCT Pub. Date: May 27, 2022

(65) Prior Publication Data

US 2023/0419328 A1 Dec. 28, 2023

Related U.S. Application Data

(60) Provisional application No. 63/115,888, filed on Nov. 19, 2020.

(51) Int. Cl.
*G06Q 20/40* (2012.01)
*G06Q 20/02* (2012.01)
(Continued)

(52) U.S. Cl.
CPC ....... *G06Q 20/4018* (2013.01); *G06Q 20/023* (2013.01); *G06Q 20/3278* (2013.01); *G06Q 20/353* (2013.01)

(58) Field of Classification Search
CPC ......................... G06Q 20/023; G06Q 20/3278
(Continued)

(56) References Cited

U.S. PATENT DOCUMENTS 8,308,059 B2 11/2012 Granucci et al.
8,534,564 B2 9/2013 Hammad
(Continued)

FOREIGN PATENT DOCUMENTS

CN 105874495 A 8/2016
JP 2008-009778 A 1/2008
(Continued)

OTHER PUBLICATIONS

International Preliminary Report on Patentability for International Application No. PCT/US2021/059607, dated May 16, 2023, 9 pages.
(Continued)

*Primary Examiner* — Hai Tran
(74) *Attorney, Agent, or Firm* — Buchanan Ingersoll & Rooney PC

(57) ABSTRACT

Systems, methods, transaction cards, mobile devices, processors, and computer memory programmed with machine-readable instructions, for providing a dynamic Card Verification Value (dCVV) to a user of a transaction card. A mobile device associated with the user and with the transaction card initiates a non-payment near field communication (NFC) with the transaction card, receives a message from the transaction card in the non-payment NFC communication, transmits a prompt to an IP address or web address over a global computer information network, and receives a secure communication from containing the dCVV from a server accessible from the IP address or web address in response to the prompt. The dCVV code is then provided to the user. In embodiments, the non-payment NFC may be
(Continued)

100 initiated via a card tap, a user interface, or a communication from a website.

15 Claims, 2 Drawing Sheets

(51) Int. Cl.
*G06Q 20/32* (2012.01)
*G06Q 20/34* (2012.01)

(58) Field of Classification Search
USPC .............................................................. 705/41
See application file for complete search history.

(56) References Cited

U.S. PATENT DOCUMENTS

| | | | | |
|---|---|---|---|---|
| 8,577,803 | B2 * | 11/2013 | Chatterjee | G06Q 20/326 705/41 |
| 8,833,648 | B1 * | 9/2014 | Medina, III | G06Q 20/401 235/382 |
| 10,438,437 | B1 | 10/2019 | Herrington et al. | |
| 11,763,292 | B2 * | 9/2023 | Dottax | G06Q 20/326 705/44 |
| 2008/0016004 | A1 | 1/2008 | Kurasaki et al. | |
| 2008/0034182 | A1 | 2/2008 | Takemura | |
| 2009/0006262 | A1 * | 1/2009 | Brown | H04L 9/32 705/64 |
| 2009/0173782 | A1 * | 7/2009 | Muscato | G06Q 20/40975 235/379 |
| 2011/0276487 | A1 * | 11/2011 | Hammad | G06Q 20/40 726/3 |
| 2012/0122447 | A1 | 5/2012 | Craft et al. | |
| 2013/0185167 | A1 | 7/2013 | Mestre et al. | |
| 2013/0254112 | A1 * | 9/2013 | Hammad | G06Q 20/40 705/44 |
| 2015/0032625 | A1 * | 1/2015 | Dill | G06Q 20/40 705/44 |
| 2015/0371234 | A1 * | 12/2015 | Huang | G06Q 20/34 705/44 |
| 2016/0275505 | A1 | 9/2016 | Salian et al. | |
| 2019/0005490 | A1 * | 1/2019 | Girodon | G06Q 20/382 |
| 2020/0151690 | A1 * | 5/2020 | Hammad | G06Q 20/20 |
| 2020/0242588 | A1 * | 7/2020 | Rule | G06F 40/174 |
| 2021/0295308 | A1 * | 9/2021 | Dottax | G06Q 20/326 |
| 2021/0342821 | A1 * | 11/2021 | Rule | G06Q 20/352 |
| 2021/0365929 | A1 * | 11/2021 | Rule | G06Q 20/382 |

FOREIGN PATENT DOCUMENTS

| | | | |
|---|---|---|---|
| JP | 2008-040594 | A | 2/2008 |
| WO | 2018235055 | A1 | 12/2018 |
| WO | 2020/014369 | A1 | 1/2020 |
| WO | 2020/154600 | A1 | 7/2020 |

OTHER PUBLICATIONS

International Search Report and Written Opinion for International Application No. PCT/US2021/059607, dated Feb. 28, 2022, 10 pages.

Office Action (Notice of Reasons for Rejection) issued Jul. 30, 2024, by the Japan Patent Office in corresponding Japanese Patent Application No. 2023-530240 and an English translation of the Office Action. (11 pages).

Office Action issued Oct. 11, 2024, by the Taiwan Intellectual Property Office in corresponding Taiwanese Patent Application No. 110142863 and an English machine translation of the Office Action. (33 pages).

Office Action (Decision of Final Rejection) issued Mar. 4, 2025, by the Japan Patent Office in corresponding Japanese Patent Application No. 2023-530240 and an English translation of the Office Action. (7 pages).

Office Action (Examination report No. 3 for standard patent application) issued Mar. 17, 2025, by the Australian Government, IP Australia in corresponding Australian Patent Application No. 2021382569. (5 pages).

Office Action (Report of Pretrial Reexamination) issued Jul. 11, 2025, by the Japan Patent Office in corresponding Japanese Patent Application No. 2023-530240 and an English Translation of the Office Action. (11 pages).

Office Action issued Dec. 2, 2025, by the Republic of Colombia Superintendency of Industry and Commerce in corresponding Colombian Patent Application No. NC2023/0006635 and an English machine translation of the Office Action. (16 pages).

Office Action (The First Office Action) issued Aug. 19, 2026, by the National Intellectual Property Administration, P.R. China in corresponding Chinese Patent Application No. 202180077785.0 and an English translation of the Office Action. (21 pages).

* cited by examiner

METHOD AND SYSTEM FOR GENERATING A DYNAMIC CARD VERIFICATION VALUE FOR PROCESSING A TRANSACTION

CROSS-REFERENCE TO RELATED APPLICATIONS

This application is a U.S. National Phase Patent Application of PCT Patent Application No. PCT/US2021/059607, filed Nov. 17, 2021, which is related to and claims priority to U.S. Provisional Application Ser. No. 63/115,888, filed Nov. 19, 2020, titled METHOD AND SYSTEM FOR GENERATING A DYNAMIC CARD VERIFICATION VALUE FOR PROCESSING A TRANSACTION, the contents of each of which are incorporated herein by reference in their entireties for all purposes.

BACKGROUND OF THE INVENTION

Various types of financial transactions are known for using a transaction card (credit card, debit card, smart card, and the like, without limitation). Increasingly, transactions are performed using online portals over a global computer information network (e.g. the Internet), such as on Amazon.com and the like, in which the online portal does not have access to the physical transaction card for processing the transaction with point of sale (POS) card reader that reads information from, e.g., a magnetic stripe on the card, an IC chip via physical contact with the card reader, or an radio frequency identification (RFID) chip through a contactless interaction or "tap." Such transactions performed entirely online, frequently referred to as "card-not-present transaction," are generally more vulnerable to fraud than transaction conducted with the physical card present (in which the retailer may have the ability to check a picture ID as part of the verification step).

Transaction cards commonly now have a "Card Verification Value" (CVV) code (e.g. a 3-digit number for VISA or MasterCard, or a 4-digit number for American Express), typically printed on the back of the card, which code may be requested by retailers as proof that the individual conducting the card-not-present transaction is in actual possession of the card. The CVV can also be referred to as a "CVV2" (second generation Card Verification Value), a "CVC" (Card Verification Code"), a "CSC" ("Card Security Code"), and the use of such codes are generally referred to as Card Verification Methods ("CVM"), and thus referred to as a "CVM code" or "CVM number." For ease of nomenclature, the term "CVV" is used herein generically, without limitation to any specific type of code.

Unfortunately, sometimes the pertinent information corresponding to a card can be compromised along with the CVV. One measure to combat fraud has been to provide a CVV that changes with some frequency. As used herein, the term "static CVV," refers to an essentially unchanging CVV, such as a printed code found on the back of a transaction card, which CVV only changes when a new physical card is issued. The term "dynamic CVV" as used herein refers to a CVV that changes more frequently than when a new physical card is issued. In some instances, the CVV may change after every transaction, to prevent unauthorized acquisition of the CVV used in a first transaction leading to fraudulent use of that same CVV in a subsequent transaction. In other instances, the dynamic CVV may change less frequently, such as on a regular period (e.g. daily, weekly, hourly, monthly, on demand, etc.), without limitation to the periodicity or frequency of the dynamic change.

Some cards may have a display built into the card, such as an LED, liquid crystal, liquid paper, or other electronic display, configured to display a dynamic CVV. Other cards may be paired with a mobile device, in which application software (e.g. an "app"), comprising machine-readable instructions stored in computer memory and readable by a processor for causing the processor to perform various method steps, may be programmed to provide the dynamic CVV to the cardholder via the app associated with the transaction card.

Once a dynamic CVV is provided as part of a transaction (e.g. by entry of transaction information via an internet portal on a website hosted by an internet retailer), the remaining part of the transaction may be performed in the same way as is known for using a static CVV, including checking the dynamic CVV as provided during a transaction against the CVV stored in association with the card number. While various methods of generating a CVV is known, issuers of transaction cards are constantly looking for ways in which to make transaction more secure, to prevent fraud. Accordingly, there is a need in the art for new methods and systems of processing transactions using dynamic CVVs.

SUMMARY OF THE INVENTION

One aspect of the invention includes a method of providing a dynamic Card Verification Value (dCVV) to a user of a transaction account associated with a transaction instrument, such as a transaction card. A mobile device that is associated with the user and with the transaction account initiates a non-payment communication, such as a near field communication (NFC) with the transaction card, receives a message from the transaction card in the non-payment communication, transmits a prompt to an IP address or web address over a global computer information network, and receives a secure communication containing the dCVV in response to the prompt. The dCVV code is then provided to the user, such as via the mobile device, such as visually, audibly, or tactilely. The dCVV may originate from a server accessible from the IP address or web address and associated with a dCVV-generation processor configured to generate a dCVV code in response to the prompt. The mobile device may be connected to the Internet.

In some embodiments, the message received by the mobile device from the transaction card is configured to cause the mobile device to open a module of application software, wherein the application software is programmed with the web address or IP address to which the prompt in step (c) is directed. In other embodiments, the message received by the mobile device from the transaction card includes the web address or IP address.

In some embodiments, the mobile device may initiate the non-payment communication after an interaction between the mobile device and the transaction instrument, such as a tap by the transaction instrument (e.g. a card tap) on the mobile device. In some embodiments, the mobile device may initiate the non-payment communication via a user interface of a module of application software. In some embodiments, the mobile device receives a prompt from a web page, generated by the web page in response to entry of information on the web page, wherein the prompt from the web page causes the mobile device to send the non-payment communication.

The method may further comprise the user of the transaction instrument supplying, over the global computer information network, the dCVV code to a transaction portal as part of transaction information, which may then further comprise a transaction processor associated with the transaction portal communicating the transaction information, including the dCVV code, to a payment transaction clearinghouse. The payment transaction clearinghouse then typically authenticates the transaction, such as by verifying the dCVV code supplied by the cardholder matches the dCVV code generated by dCVV-generation processor.

Another aspect of the invention is a system for processing a transaction using a transaction instrument. The system comprises a transaction instrument (such as a transaction card) having an instrument passive proximity communications interface (e.g. a near field communication (NFC) interface), an instrument memory, and an instrument processor; a mobile device having a mobile device memory, a mobile device processor, a mobile device user interface, a mobile device proximity coupling device interface (e.g. an NFC interface), and a telecommunications interface configured to connect to a global computer information network; and a computer server connected to or in communication with the IP address or web address and connected to a dCVV-code-generating processor. Instructions embodied in the instrument memory, readable by the instrument processor, are configured to cause the instrument proximity communication interface, when prompted by a first non-payment communication, to return a message via a second non-payment communication. The mobile device memory has instructions embodied therein, readable by the mobile device processor, configured to cause the mobile device to initiate the first non-payment communication from the mobile device to the transaction instrument, receive the message from the transaction instrument via the second non-payment communication from the transaction instrument to the mobile device, and transmit a prompt from the telecommunications interface to an IP address or web address over the global computer information network in response to receipt of the message from the transaction instrument. The computer server is configured to, in response to receipt of the prompt from the mobile device, cause the dCVV-code-generating processor to generate a dynamic Card Verification Value (dCVV) code. The computer server is further configured to send a secure communication containing the dynamic CVV code to the mobile device over the global computer information network.

The system may further include a transaction portal accessible from the global computer information network and configured to receive transaction information, including the dynamic CVV, over the global computer information network. A transaction processor in communication with the transaction portal and configured to process a payment transaction may be configured to receive the transaction information, including the dynamic CVV code, from the transaction portal, and to communicate the transaction information to a payment transaction clearinghouse, over the global computer information network. The payment transaction clearinghouse, connected to the global computer information network, in communication with the transaction processor and the computer server connected to the dCVV-code-generation processor, may comprise a computer memory and a computer processor. The payment transaction clearinghouse is configured to receive the transaction information from the transaction processor over the global computer information network, to authenticate the transaction by verifying the dCVV code supplied with the transaction information matches the dCVV code generated by dCVV-code-generation processor, and to send an authentication verification to the transaction processor over the global computer information network.

In some embodiments, the message received by the mobile device from the transaction instrument may be configured to cause the mobile device to open a module of application software, wherein the application software is programmed with the web address or IP address to which prompt in step (c) is directed. In some embodiments, the message received by the mobile device from the transaction card includes the web address or IP address. In some embodiments, the mobile device is configured to initiate the non-payment communication in response to an interaction between the mobile device and the instrument, such as a card tap on the mobile device. In some embodiments, the mobile device is configured with instructions for causing the mobile device to initiate the non-payment communication in response to receipt of a prompt from a user interface. In some embodiments, a web page embodying machine-readable instructions residing on a computer processor is configured to prompt the mobile device to initiate the non-payment communication in response to entry of information on the web page.

Yet another aspect of the invention includes a mobile device comprising a memory, a processor, a user interface, a proximity coupling communication interface (e.g. a near field communication (NFC) interface), a telecommunications interface configured to connect to a global computer information network, and at least one of: a display, a sound generator, and a haptic stimulus generator. Instructions embodied in the memory and readable by the processor are configured to cause the mobile device to perform the steps of initiating a first non-payment communication with a transaction instrument associated with the mobile device, receiving a second non-payment communication from the transaction instrument containing an NFC message, transmitting a prompt to an IP address or web address over a global computer information network in response to receipt of the NFC message; receiving a secure communication from the IP address or web address, the secure communication including a dCVV code; and communicating the dCVV code visually via the display, audibly via the sound generator, or tactilely via the haptic stimulus generator.

Still another aspect of the invention comprises a transaction instrument having a passive proximity communication interface, a memory and a processor. Instructions embodied in the memory, readable by the processor, are configured to cause the passive proximity communication interface, when prompted by a first non-payment communication from a mobile device, to return a message via a second non-payment communication. The message comprises an IP address or web address or instructions for causing a module of application software to open on the mobile device, wherein the application software is configured with the IP address or the web address. The transaction instrument may further include a contactless payment module, in which case the memory may further contain instructions readable by the processor for causing the contactless payment module to conduct one or more payment communications with a transaction card reader. The transaction instrument may have a first discrete memory or memory portion, a first discrete processor or processing portion, and a first discrete passive proximity communications interface configured to conduct the first and second non-payment communications, and a second discrete memory or memory portion, a second discrete processor or processing portion, and a second discrete passive proximity communications interface configured to conduct the one or more payment communications. In embodiments, the transaction instrument may be a transaction card, and the contactless payment module may be a dual interface (DI) module having contacts for physical connection to a card reader. The card may further include a magnetic stripe, a machine-readable code, a human-readable indicia comprising information required for conducting a payment transaction, or combinations thereof. The human-readable indicia may include embossed, printed, or laser-marked alphanumeric information. The card may have at least one layer comprising metal, ceramic, or glass.

Yet another aspect of the invention comprises a method for initiating a dynamic Card Verification Value (dCVV) code request, the method comprising the steps of providing a transaction instrument as described herein, receiving the first non-payment communication; and returning the message via the second non-payment communication, wherein the IP address or web address has connected thereto a system configured to generate and return the dCVV in response to a prompt.

Still another aspect of the invention is a dynamic Card Verification Value (dCVV) code generating system comprising a computer server connected to or in communication with a unique IP address or web address on a global computer information network, a dCVV-code-generating processor connected to the computer server; and a communications interface configured to send secure communications via the global computer information network. The system is configured to, in response to receipt of a prompt from a mobile device via the IP address or web address, cause the dCVV-code-generating processor to generate a dCVV code, and to transmit a secure communication containing the dCVV code in a secure communication over the global computer information network to a secure location accessible to a cardholder. The dCVV-code-generating system may also be configured to transmit the secure communication containing the dCVV code to the mobile device. The system may be configured to receive the prompt by a first type of communications protocol and to send the secure communication via a second type of communications protocol.

Still another aspect of the invention includes a method for providing a dynamic Card Verification Value (dCVV) code. The method comprises the steps of providing the dCVV-code-generating system as described herein, accessible via the IP address or web address, receiving the prompt from the mobile device, generating the dCVV code, and transmitting the secure communication to the secure location.

Yet another aspect of the invention includes non-transitory computer memory media comprising instructions readable by a machine for causing a mobile device to perform the method steps of associating a transaction account and a transaction instrument with the mobile device, initiating a first non-payment communication with the transaction instrument using a communication interface embedded in the mobile device, receiving a second non-payment communication from the transaction card containing a message, transmitting a prompt to an IP address or web address over a global computer information network via a telecommunications interface of the mobile device, receiving a secure communication from the IP address or web address, the secure communication including a dCVV code, and communicating the dCVV code visually via a display, audibly via a sound generator, or tactilely via a haptic stimulus generator embedded in the mobile device. In some embodiments, at least a portion of the memory may be embedded in the mobile device. In some embodiments, at least a portion of the memory is embedded in a server accessible to the mobile device over the global computer information network. The machine-readable instructions may include instructions corresponding to application software configured to store the IP address or web address. The machine-readable instructions may also include instructions for initiating the non-payment communication in response to an interaction between the mobile device and the transaction instrument, such as in response to a tap of the transaction device (e.g. a card tap) on the mobile device. The machine-readable instructions may also include instructions for causing the mobile device to initiate the non-payment communication in response to receipt of a prompt from a user interface.

DETAILED DESCRIPTION OF THE INVENTION

Figure 1:
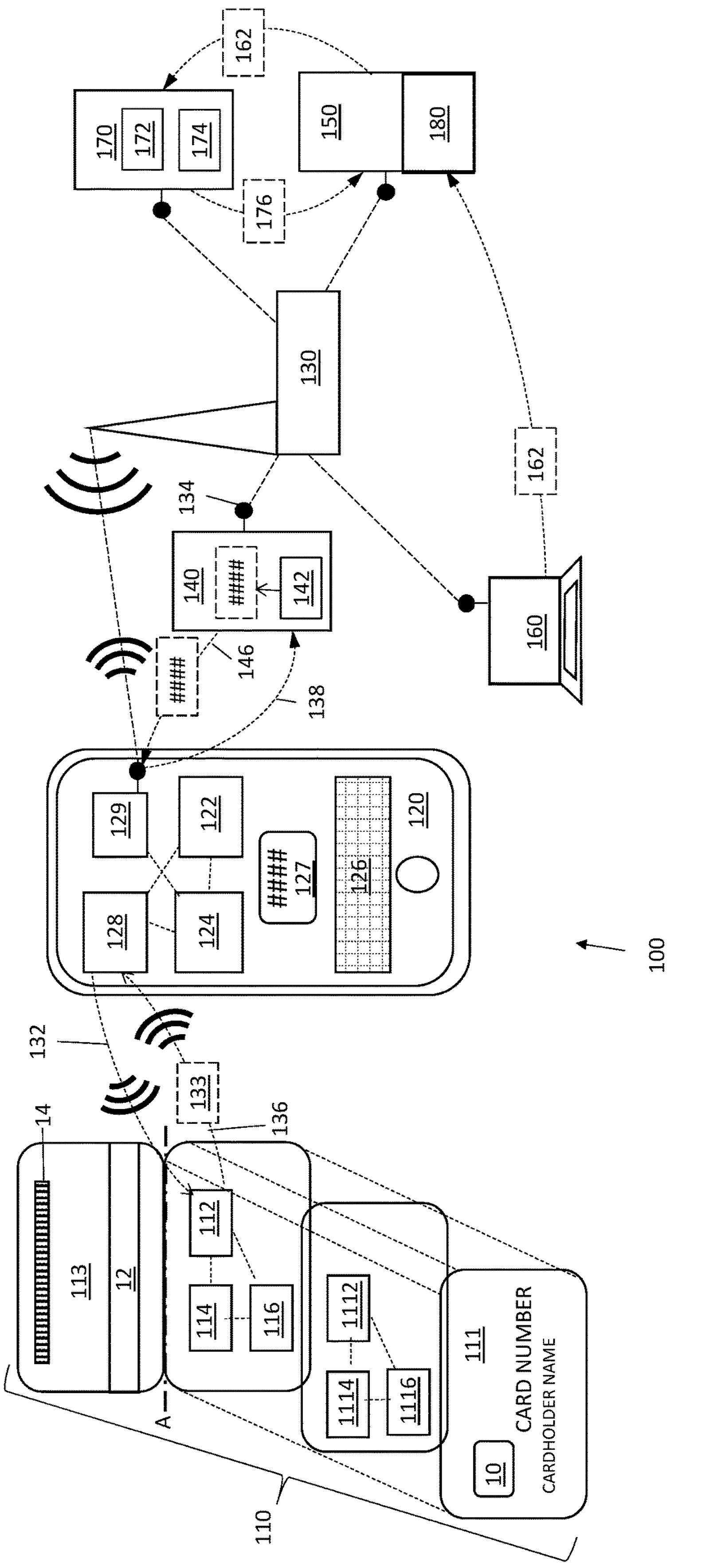
FIG. 1 depicts an exemplary system embodiment in accordance with the present invention.

Referring now to FIG. 1, there is shown an exemplary system 100 for processing a transaction using a transaction card 110. Exemplary transaction card 110 is depicted in an exploded manner, in which various components internal and external to the card are depicted schematically. The location of the various components is not limited to the depictions shown. Transaction card 110 has a card near field communication (NFC) interface 112, a card memory 114, and a card processor 116. Card memory 114 and processor 116 may be securely combined onto a single "secure element" chip. The foregoing electronic components may be stored on one or more integrated circuit (IC) chips embedded in the card. In some embodiments, one or more of card memory 1114, card processor 1116, and NFC interface 1112 that is/are separate and discrete from the respective NFC interface 112, card memory 114, and card processor may be provided. In one embodiment, memory 1114, processor 1116, and NFC interface 1112 may be provided for conducting card-present, physical payment transactions, and memory 114, processor 116, and NFC interface 112 may be provide for conducting non-payment transactions in accordance with method embodiments, such as card-not-present financial transactions, as further discussed herein. In other embodiments, card memory 114, card processor 116, and NFC interface 112 may configured both for processing payment and non-payment transactions. In still other embodiments, memory 1114 may be a segmented portion of memory 114, processor 1116 may be co-located with processor 116 on a single dual-processor chip, and a single NFC interface 112 controllable by both processor 1116 and 116 may be provided, with appropriate separation between memory segment 1114 and the remaining portion of memory 114 such that a breach in the security of memory 114 does not result in a pathway to breach memory segment 1114.

Physical (card-present) financial transactions may be conducted via a point of sale (POS) card reader (not shown) that reads information from payment module 10. Payment module 10 may be a dual interface (DI) integrated circuit IC chip operable to provide payment information to a card reader via physical contact with the card reader through contacts accessible from a surface of the card, or via a contactless communication with a radio frequency identification (RFID) chip included in the module, as is well known in the art.

As depicted, front surface 111 of card 110 also has printed, embossed, or laser marked indicia forming a card number and a cardholder name. The back surface 113 (depicted rotated 180 degrees about axis A, for illustrative purposes) of card 110 shows a magnetic stripe 12 and a machine readable code 14, which may be bar code, a QR-code, or any code known in the art. Although not pictured, the card may have other features commonly found in a card, such as a security hologram, a photograph of the cardholder, a signature stripe, biometric readers, display screens, decorative features, and the like, without limitation. Additional human and/or machine-readable indicia may also be provided, such as issuing financial institution information (e.g. bank name), card branding (e.g. VISA®, AMERICAN EXPRESS®, MASTERCARD®, etc.), the expiration date, membership club information, affinity information (e.g. branding associated with a university, a sports team, a charitable cause, etc.), and the like. The various features shown on card 110 are not limited to any particular location. Although not limited to any particular type of card, exemplary cards may comprise at least one layer that is metal, ceramic, and/or glass, such as compositions depicted in one or more co-pending applications owned by CompoSecure, the common assignee of this application.

As described further herein, machine-readable instructions embodied in the card memory, readable by the card processor, are configured to cause the card NFC interface, when prompted by an incoming non-payment NFC communication 132, to return information 133 via an outgoing non-payment NFC communication 136. The NFC communication may take the form of an NFC data exchange format (Ndef) message. The information 133 may include information identifying an IP address or web address 134, or the information may cause a module of application software (i.e. an "app") to open on the mobile device, which app may provide the web or IP address. Card memory 114 may also contain instructions for causing card processor 116 to perform the operative steps for conducting financial transactions (e.g. for providing card information to a card reader in response to a suitable prompt as a payment NFC communication or via contacts on the card), or a discrete memory and processor may be associated with functions for performing financial transactions, and memory 114 and processor 116 may be dedicated to performing only the method and system as described herein for generating a dynamic CVV (dCVV).

Mobile device 120 (e.g. a cellular telephone, tablet, portable computer, etc. with NFC capability) has a mobile device memory 122, a mobile device processor 124, a mobile device user interface 126 (e.g. a touch screen, voice command capability, virtual keyboard capability, without limitation), a mobile device display 127 (which may encompass the majority of the surface area of the device), a mobile device NFC interface 128, and a telecommunications interface 129 configured to connect to a global computer information network 130. The mobile device is associated with the transaction card, typically by a cardholder downloading application software (an "app") associated with the issuer of the card (e.g. VISA®, AMERICAN EXPRESS®, MASTERCARD®, a financial institution such as a bank, credit union, a brokerage firm, and/or the like), and then entering information and performing other processes that cause the app and the device to be associated with the card and the cardholder. As understood by those of skill in the art, the application software utilized on a mobile device may include a "thin" portion that resides in local computer memory of the mobile device, and a "thick" portion that resides "in the cloud" (e.g. on a server accessible to the mobile device over the global computer information network 130). The application software comprises machine-readable commands embodied in memory that whey read by the machine causing a processor to perform corresponding method steps.

Instructions embodied in the mobile device memory 122, readable by the mobile device processor 124, are configured to cause the mobile device 120, when prompted via the user interface 126, to carry out certain method steps as described herein, which include initiate the (outgoing from the mobile device, and incoming to the card) non-payment NFC communication 132 with the transaction card, receiving the information 133 containing the IP address or web address 134 from the transaction card via the (outgoing from the card, but incoming to the mobile device) non-payment NFC communication 136 from the transaction card; and transmitting a prompt 138 to the IP address or web address over the global computer information network 130.

In embodiments in which the information 133 (e.g. Ndef message) transmitted from the card to the mobile device opens an app, all cards can be programmed to transmit the same Ndef message, and each app can be configured to contain unique information corresponding to the web address or IP address to which prompt 138 is directed. In other embodiments, the secure element 114, 116 may be personalized with the unique IP address to be communicated as the information 133 in the Ndef message. In some embodiments, the NFC communication 132 may be prompted by an interaction between the card and the mobile device, such as a card tap that causes the phone to sense the RFID chip in the card, prompting the initial NFC communication. In an app-driven embodiment, a user may first open an app on the mobile device, and cause the app to send the non-payment NFC communication 132 to the card. In another embodiment, the user may prompt the non-payment NFC communication by entering information on a web page (e.g. a check out web page on which payment information is entered) that causes a communication to be sent to the mobile device that prompts the mobile device to initiate a non-payment NFC communication to the card.

As indicated herein, communications from one element in FIG. 1 to another are depicted as going directly from one component to another, but it should be understood that because each of the devices is connected via the depicted node (signified by a dark circle attached to a line emanating from each device) connected to a "global computer information network" (present and non-limiting examples of which are commonly referred to as "the Internet" or the "World Wide web") 130, the communications travel through various switches, relays, servers, nodes, and the like from one connected device to another, and may include wired and wireless communications using any of various protocols known in the art, without limitation. The communications may be encrypted, for security purposes.

Computer server 140 comprises a processor 142 for generating a dynamic Card Verification Value (dCVV), e.g. "1234" or "931," signified as "####" in the figures, although not limited to any number of digits. While the code is typically a numeric code, it is not so limited, and may be, for example, any code formed from alphanumeric characters or a combination of alphanumeric and special (e.g. #, $, %, &, @) characters. The computer server 140 is connected to or in communication with the IP address or web address 134, and is programmed with instructions for causing the dCVV generating processor 142 to generate a dCVV code in response to the prompt 138 from the mobile device and to send a secure communication 146 containing the dynamic CVV code to the mobile device via the IP address or web address over the global computer information network 130.

The term "secure communication" typically refers to an encrypted text message, an encrypted email, or an encrypted communication sent over the internet, decrypted by the device or carrier, and then presented by the app on the mobile device associated with the transaction card. The secure communication is typically sent over a cellular telephone network, without limitation to any particular technology (e.g. GSM, CDMA, LTE, etc.) or generation (e.g. 4g, 5g, etc.), such as but not limited to via a short messaging service (SMS) or via XML messages sent over Secure Sockets Layer (SSL) connections with authentication (e.g. using digital certificates). By contrast, the prompt received from the mobile device to the server 140 may use a different communications protocol, such as may be used by any standard over-the-internet communications protocol, such as Hypertext Transfer Protocol (HTTP) or HTTP over Transport Layer Security (TLS) or SSL. Although the secure communication containing the dCVV is sent to the mobile device in some embodiments, the invention is not limited thereto. The secure communication containing the dCVV may be sent to any secure location accessible to a cardholder. As non-limiting examples, the communication may be sent to an email address, or to a designated mobile device different than the initiating mobile device.

Point of sale (POS) transaction portal 180, connected to transaction processor 150 and to the global computer information network 130, is configured to receive the transaction information 162, including the dCVV, from a cardholder transaction input device 160 over the global computer information network as part of a card-not-present transaction and send the transaction information to the transaction processor. Transaction processor 150 connected to the global computer information network 130 (either separate from, or commonly located with, the POS transaction portal 180) is configured to receive input transaction information 162, including the dCVV code, relayed by the POS transaction portal from cardholder transaction input device 160, and to cause the transaction information 162 to be communicated to a payment transaction clearinghouse 170, over the global computer information network. Payment transaction clearinghouse 170 is in communication with the transaction processor 150 and the computer server 140 via the global computer information network 130 (or via any means known in the art), and includes a computer memory 172 and a computer processor 174. The payment transaction clearinghouse is configured to receive the transaction information from the transaction processor over the global computer information network, to authenticate the transaction by verifying the dCVV code supplied with the transaction information matches the dCVV code generated by dCVV-generation processor, and to send an authentication verification 176 to the transaction processor over the global computer information network.

In a typical operation, cardholder transaction input device 160 typically accesses the POS transaction portal 180 over the global computer information network. Although depicted as a laptop computer, cardholder transaction input device 160 may include a mobile device (which may be, but is not necessarily, the same mobile device 120 as used for performing other steps in the method), a computer, a tablet, a kiosk, a telephone interface including human operator assisted interfaces in which a human transcribes information verbally transmitted by phone to a device connected to the Internet, automated interfaces with speech recognition and/or operated by touch tone prompts, a gaming system, or any device known in the art now or in the future capable of receiving input of transaction information via a card not present transaction. Notably, although tailored especially for card not present transactions, the invention is not limited thereto, and there may be circumstances in which the cardholder transaction input device 160 may be a typical card reader known in the art (e.g. capable of reading information from a physical card via a payment NFC communication, via an RFID chip, a contact chip reader, a mag stripe reader, a bar code reader, or the like) associated with a user interface for receiving an input comprising the dCVV. As used herein, the term "cardholder" is not limited to the authorized user of a card, but to anyone carrying out a transaction using the transaction card and the dynamic CVV.

Figure 2:
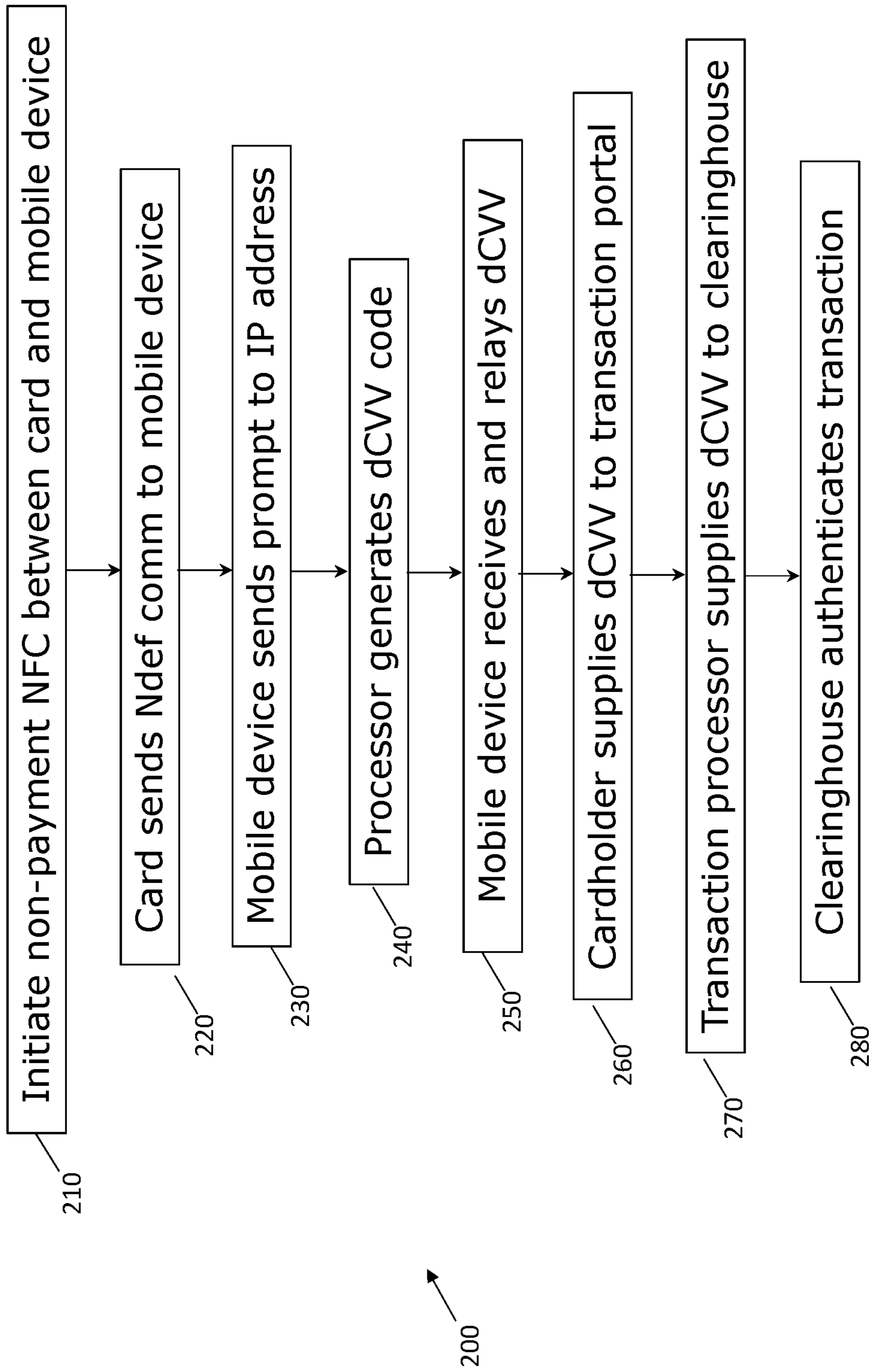
FIG. 2 depicts a flowchart of an exemplary method embodiment in accordance with the present invention.

Within the overall process of conducting a payment transaction, the cardholder transaction input device 160 is typically queried by the POS transaction portal 180 for transaction information 162, which may include any or all of the cardholder name, the card number, cardholder address information (including one or all of street address, house or unit number, city, state, country, and zip code), optionally, a cardholder telephone number, and the dCVV. The step of providing the dCVV as part of the transaction information, in accordance with one embodiment of the invention, includes performing the steps of exemplary method 200 depicted in FIG. 2.

In step 210 of method 200, the cardholder initiates a non-payment NFC communication between the transaction card 110 and the mobile device 120 connected to the Internet 130. In step 220, the card sends (and the mobile device receives) information 133 corresponding to IP address or web address 134 from the transaction card 110 in the non-payment NFC communication, and in step 230, the mobile device 120 transmits a prompt to the IP address or web address 134 over the Internet 130. In step 240, the dCVV-generation processor, connected to or in communication with the IP address or web address, generates the dCVV code in response to the prompt. In step 250, the server sends a secure communication containing the dCVV code to the mobile device, which relays the dCVV number to the cardholder (e.g. by visually displaying it or by another means, e.g. audibly or tactilely via a braille generator for the visually and/or hearing impaired). The cardholder (e.g. via the cardholder transaction input device 160) then supplies the dCVV to the transaction processor in step 260. In step 270, the transaction processor communicates the transaction information, including the dynamic CVV supplied by the cardholder, to the payment transaction clearinghouse. In step 280, the payment transaction clearinghouse authenticates the transaction, which typically includes verifying the dynamic CVV supplied by the cardholder matches the dynamic CVV generated by CVV-generation processor.

To the extent "transaction cards" are referenced herein, suitable cards include cards in conformance with the ISO/IEC 7810 ID-1 standard, in which the cards have lateral dimensions of 85.60×53.98 mm (3⅜ in×2⅛ in), with rounded corners having a radius of 2.88-3.48 mm (about ⅛ in), and an overall thickness of 0.76 mm (1/32 in), but the invention is not limited to cards having any particular size, shape or proportion. Similarly, although described herein primarily with reference to implementations using a transaction card, it should be understood that the methods and systems as described herein may be implemented using devices other than cards. For example, any passive proximity integrated circuit (i.e. a circuit configured for returning a signal in response to a query event such as movement through a field or receipt of a signal created by a reader), readable by any proximity coupling device (i.e. a reader configured to create the query event), may be used for performing the method steps. Thus the role of the "transaction card" as described herein may be performed by any transaction instrument of any shape and size having such a passive proximity circuit configured to be coupled to a proximity coupling device, and configured to exchange the messages as set forth herein. Thus, in addition traditional "cards," the passive transaction instruments used in connection with the various embodiments of the invention may include watches, rings, wristbands, jewelry, key fobs, without limitation to any particular type of apparatus. Accordingly, use of the term "dynamic card verification value" and its abbreviation dCVV in the claims herein is not intended to limit the claimed invention only to embodiments that use traditional transaction cards, and no such limitation should be inferred from use of such terms. Additionally, while discussed herein primarily in the context of NFC communications, the invention is not limited to any particular communication protocol or proximity for the non-payment communications between the mobile device and the transaction instrument. Rather, a passive transaction instrument of any construction may be used for exchanging the messages as discussed herein using any communication methodology between the mobile device and the transaction instrument.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of providing a dynamic Card Verification Value (dCVV) to a user of a transaction instrument, the method comprising the steps of:

(a) a mobile device, associated with the user and with an account associated with the transaction instrument, initiating a non-payment communication between the mobile device and the transaction instrument by sending a first non-payment communication from the mobile device to the transaction instrument;

(b) the mobile device receiving a message from the transaction instrument in the non-payment communication;

(c) the mobile device transmitting a prompt to an IP address or web address over a global computer information network;

(d) the mobile device receiving a secure communication in response to the prompt, the communication containing the dCVV code;

(e) providing the dCVV code to the user; and (f) the user of the transaction instrument supplying, from a cardholder transaction input device over the global computer information network, the dCVV code to a transaction portal as part of transaction information, wherein the cardholder transaction input device is different from the mobile device and is not directly connected to the mobile device, wherein the transaction instrument includes a first memory for conducting card-present, physical payment transactions and a second memory for conducting non-payment transactions, and wherein the first memory is separate and discrete from the second memory.

2. The method of claim 1, wherein the transaction instrument is a transaction card.

3. The method of claim 1, wherein the non-payment communication is a near-field communication (NFC).

4. The method of claim 1, wherein the communication containing the dCVV code originates from a server associated with a dCVV generation processor that is configured to generate the dCVV code.

5. The method of claim 1, comprising providing the dCVV code to the user via the mobile device.

6. The method of claim 5, wherein the mobile device provides the dCVV code visually, audibly, or tactilely.

7. The method of claim 1, wherein the mobile device is connected to the Internet.

8. The method of claim 1, wherein the message received by the mobile device from the transaction instrument is configured to cause the mobile device to open a module of application software, wherein the application software is programmed with the web address or IP address to which the prompt in step (c) is directed.

9. The method of claim 1, wherein the message received by the mobile device from the transaction instrument includes the web address or IP address.

10. The method of claim 1, wherein the mobile device initiates the non-payment communication after an interaction between the mobile device and the transaction instrument.

11. The method of claim 10, wherein the interaction between the mobile device and the transaction instrument is a tap on the mobile device.

12. The method of claim 1, wherein the mobile device initiates the non-payment communication via a user interface of a module of application software.

13. The method of claim 1, wherein the mobile device receives a prompt from a web page, generated by the web page in response to entry of information on the web page, wherein the prompt from the web page causes the mobile device to send the non-payment communication.

14. The method of claim 1, further comprising the step of:

(g) a transaction processor associated with the transaction portal communicating the transaction information, including the dCVV code, to a payment transaction clearinghouse.

15. The method of claim 14, further comprising the step of:

(h) the payment transaction clearinghouse authenticating the transaction, wherein authenticating includes verifying the dCVV code supplied by the cardholder matches the dCVV code generated by dCVV-generation processor.

* * * * *